US006361466B1

(12) United States Patent
Kyrtsos

(10) Patent No.: US 6,361,466 B1
(45) Date of Patent: Mar. 26, 2002

(54) TEMPERATURE BASED DIFFERENTIAL LOCK CONTROL

(75) Inventor: Christos Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/504,525

(22) Filed: Feb. 15, 2000

(51) Int. Cl.[7] ................................................ F16H 48/30

(52) U.S. Cl. .......................... 475/237; 475/250; 477/98

(58) Field of Search ................................ 475/237, 250; 477/98; 180/249, 250, 247

(56) References Cited

U.S. PATENT DOCUMENTS 4,549,448 A * 10/1985 Kittle ....................... 475/86 X
4,884,470 A * 12/1989 Onoue ....................... 475/89 X
4,895,217 A * 1/1990 Hueckler et al. ....... 180/247 X
4,974,696 A * 12/1990 Miyajima et al. ......... 475/86 X
5,125,490 A * 6/1992 Suzumura et al. ...... 180/249 X
5,301,769 A * 4/1994 Weiss ......................... 180/249
5,373,912 A * 12/1994 Haiki et al. ................. 180/249
5,451,188 A * 9/1995 Kraft et al. ................. 475/237
6,174,255 B1 * 1/2001 Porter et al. .................. 475/84

* cited by examiner

*Primary Examiner*—Charles A Marmor
*Assistant Examiner*—Ha Ho
(74) *Attorney, Agent, or Firm*—Carlson, Gaskey & Olds

(57) ABSTRACT

The temperature-based differential lock control monitors the temperature of a differential lock in a vehicle driveline. Depending on the detected temperature, the differential lock is automatically disengaged to avoid potential damage to the differential lock. The control preferably includes a controller that records information regarding the detected temperature over time.

20 Claims, 1 Drawing Sheet

26
20
24
22
32
30
28

TEMPERATURE BASED DIFFERENTIAL LOCK CONTROL

BACKGROUND OF THE INVENTION

This invention generally relates to a control for a differential lock in a vehicle drive line. More particularly, this invention relates to a temperature-based control for a differential lock.

Modern day vehicles sometimes include a differential lock that is selectively engaged for off road driving. Typically, a driver is provided with a manual switch or lever that is moved to engage the differential lock when desired. The differential lock operates in a conventional manner.

One problem associated with conventional differential lock systems is that a driver or vehicle operator may engage the differential lock and then subsequently fail to disengage the differential lock. When the differential lock is engaged over long periods of time a potential exists for damage or undesirable wear to the differential lock.

Another issue associated with differential locks is monitoring them for potential operation difficulties. If such potential difficulties can be monitored or detected, then the vehicle can be serviced rather than waiting until the differential lock fails, which requires additional expenses for completing repairs.

Accordingly, there is a need for a differential lock control system that reduces the likelihood that a differential lock is engaged while it is not necessary. Additionally, it is desirable to provide a system that can detect potential differential lock difficulties prior to a failure of the device. This invention addresses those needs and provides a system and control methodology that avoids the shortcomings and drawbacks of previous attempts.

SUMMARY OF THE INVENTION

In general terms, this invention is a control for a differential lock in a vehicle drive line. The control preferably is a temperature-based control that utilizes an operating temperature of the differential lock to determine an appropriate operating condition.

A system designed according to this invention preferably includes a manually operable switch, that is activated by a driver of the vehicle, for selectively engaging the differential lock. A temperature sensor preferably is supported near the differential lock. A controller receives input from the temperature sensor and automatically disengages the differential lock whenever the temperature detected by the sensor exceeds a chosen threshold.

In the preferred embodiment, the controller preferably is programmed to monitor fluctuations in the detected temperature and to record data indicating the temperatures over time. The controller also preferably tracks that data over time. This data can then be utilized by a service technician, for example, to determine whether the differential lock has been operated in an appropriate manner. Additionally, the data over time can provide an indication when service may be necessary, which facilitates avoiding more expensive repairs if a condition is not remedied sooner rather than later.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
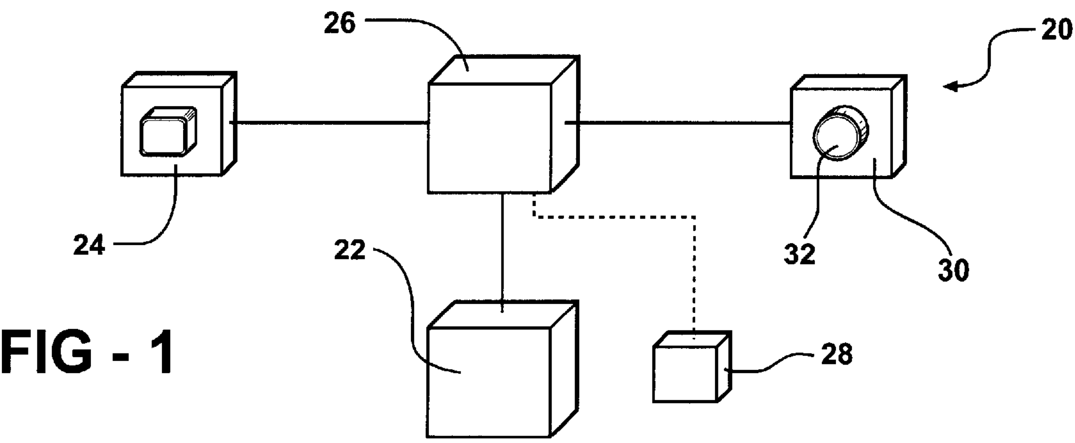
FIG. 1 schematically illustrates a control system designed according to this invention.

FIG. 1 schematically illustrates a control system 20 for controlling a differential lock 22 in a vehicle drive line. Differential locks are well known in the art. The system 20 includes a manually operable switch 24 that allows a driver of a vehicle, for example, to selectively engage the differential lock 22. Example manual switches include push buttons, toggle switches or levers that are moved by a vehicle driver to indicate a desire to have the differential lock 22 engaged.

A controller 26 controls the operation of the differential lock 22 by selectively engaging or disengaging the differential lock 22. The controller 26, as will be described in more detail below, can take various forms. Given this description, those skilled in the art will be able to choose the particular components or arrangement of a controller 26 to meet the needs of a particular situation. Further, those skilled in the art who have the benefit of this description will be able to choose from among commercially available microcontrollers and to develop appropriate programming for such devices to realize the controller 26 described in this specification.

A temperature sensor 28 is supported near the differential lock 22. The temperature sensor 28 preferably communicates with the controller 26 and provides temperature information to the controller 26 about the differential lock 22. Since the differential lock 22 will typically heat up with prolonged use, the temperature sensor 28 provides information about how long the differential lock is engaged, for example. The temperature sensor 28 may be any one of a thermocouple, thermostat, RTD, or a thermistor. Those skilled in the art will be able to chose an acceptable sensor for their particular situation.

The temperature sensor 28 preferably is located near, but does not contact the differential lock 22. By having the temperature sensor 28 separate from the differential lock 22, although near enough to detect the required temperature, there is no concern with accommodating the moving parts of the differential lock 22. Alternative arrangements including having the sensor contact the differential lock. Another example places the temperature sensor within the differential lock.

The controller 26 preferably utilizes the temperature information from the temperature sensor 28 to automatically control the differential lock 22 under certain circumstances. For example, when a driver utilizes the switch 24 to engage the differential lock 22 and then mistakenly leaves it engaged, the resulting temperature detected by the temperature sensor 28 provides an indication to the controller 26 that the differential lock 22 has been left engaged. The controller 26 preferably disengages the differential lock 22 after a chosen temperature threshold has been reached. The chosen temperature threshold may vary depending upon the design of a particular vehicle or a particular vehicle drive line. In one example, 120° F. is considered a critical temperature. The chosen threshold preferably is such that the differential lock 22 will be automatically disengaged before any undesirable wear or damage is imposed on the differential lock 22 because of the prolonged engaged condition.

In one example embodiment, the controller 26 also uses time information and automatically disengages the differential lock 22 when it has been left engaged over a chosen time period.

Figure 2:
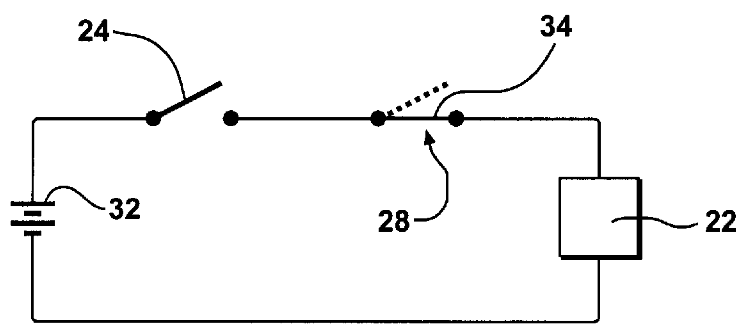
FIG. 2 schematically illustrates one embodiment of this invention.
Figure 3:
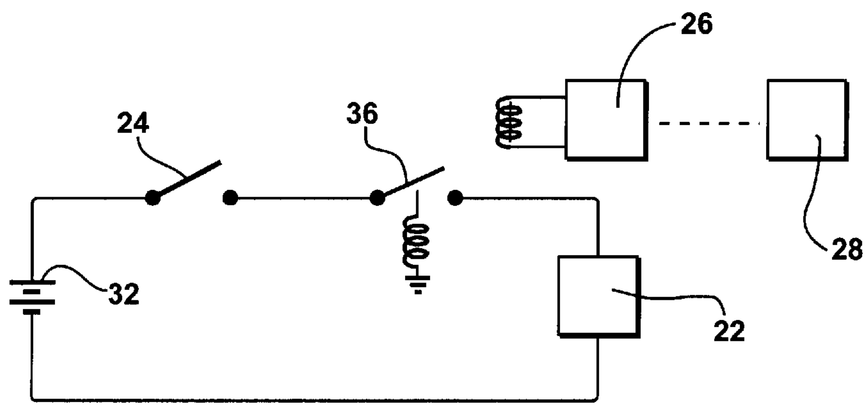
FIG. 3 schematically illustrates another embodiment of this invention.
Figure 4:
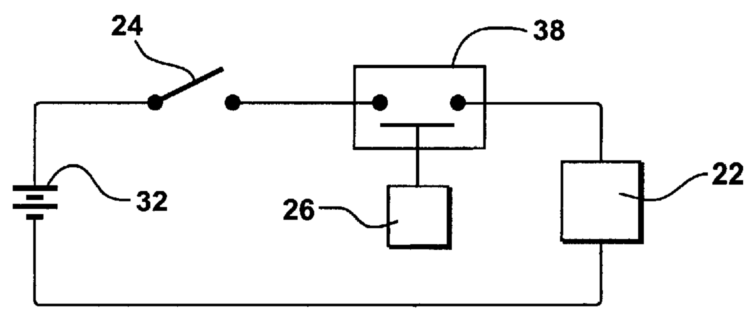
FIG. 4 schematically illustrates a third embodiment of this invention.

The controller 26 may operate a separate switch (as shown in FIGS. 2 through 4 described below) or may override the manual activation of the switch 24. A variety of strategies for disengaging the differential lock responsive to a detected temperature are within the scope of this invention.

The control system 20 illustrated in FIG. 1 also includes a driver indicator portion 30 that has a warning element 32 that warns the driver of the high temperature condition of the differential lock 22. The indicator 32 can be a visible or audible signaling device that is readily noticed by a vehicle driver when activated. The controller 26 preferably provides an indication to the driver that the temperature detected by the temperature sensor 28 has approached or exceeded the chosen threshold and, therefore, a potentially undesirable situation with the differential lock 22 exists. In some situations, it may be desirable to program the controller 26 to provide a more sophisticated indication to the driver through the driver indicator 30 such as providing a readout of temperature fluctuations over time or for suggestions to disengage the differential lock 22 under certain circumstances.

The controller 26 preferably includes memory that tracks temperature information gathered by the sensor 28 over time. The fluctuations or changes in the temperature over time provide an indication of the wear on the differential lock 22. They also provide an indication of the average amount of time that the differential lock is engaged during vehicle operation. This stored data or information can then be made available to a service technician to diagnose whether a potential problem may exist with the differential lock 22. In this way, a service technician may be able to service the differential lock 22 before an actual problem exists, which provides benefits in reducing repair costs.

FIG. 2 schematically illustrates an example implementation of this invention. A power source 32 is shown to power the differential lock 22 whenever the manual switch 24 is operated by the driver of the vehicle, for example. When the switch 24 is closed, the circuit is complete and the differential lock 22 is powered or engaged. The temperature sensor 28 in this embodiment is incorporated into a thermostat 34, which preferably is a normally closed switch. Whenever the temperature of the differential lock 22 exceeds the chosen threshold, the thermostat 34 preferably opens (as shown in phantom) to open the circuit such that the differential lock 22 is disengaged.

FIG. 3 schematically illustrates another example implementation of this invention. In this example, a relay switch 36 is controlled by the controller 26 and selectively opened whenever the temperature detected by the sensor 28 exceeds the chosen threshold.

FIG. 4 illustrates another implementation of this invention, which includes an electronic switching device 38 that is controlled by the controller 26. Electronic circuitry can be utilized for automatically disengaging the differential lock 22 whenever the detected temperature indicates a need to do so.

The controller 26 preferably monitors a temperature range of operation of the differential lock 22. A chosen threshold may be a first temperature while a second chosen threshold may be a lower temperature. Whenever the first temperature is exceeded, the controller 26 preferably does not reengage the differential lock 22 until the temperature falls below the second chosen threshold. In other words, whenever the temperature exceeds the chosen threshold, it must later decrease outside of a chosen range (below the second chosen threshold) before the controller 26 will allow the differential lock 22 to be re-engaged.

Additionally, having a second chosen threshold preferably defines a range of temperatures that are of interest to be recorded as part of the data in the memory of the controller 26. Utilizing a temperature range to control when temperature data is recorded saves memory within the controller 26 while still providing useful information to a service technician, for example.

Example implementations of this invention have been described. Variations and modifications to the disclosed examples may become apparent to those skilled in the art that do not necessarily depart from the basis of this invention. The scope of legal protection given to this invention can only be determined by studying the following claims.

What is claimed is:

1. A system for controlling a differential lock in a vehicle driveline, comprising a manually operable switch for selectively engaging the differential lock;

a temperature sensor supported near the differential lock; and a controller that receives input from the temperature sensor and automatically disengages the differential lock whenever the temperature detected by the sensor exceeds a chosen threshold.

2. The system of claim 1, wherein the controller determines the temperature detected by the sensor and monitors the detected temperature over time and stores data representative of the temperature over time.

3. The system of claim 1, wherein the controller automatically opens the manually operable switch upon determining that the chosen threshold has been exceeded.

4. The system of claim 1, including an automated switch positioned in a circuit between an energizing portion of the differential lock and the manually operable switch and wherein the controller controls the automated switch to disengage the differential lock.

5. The system of claim 4, wherein the automated switch includes a relay switch.

6. The system of claim 4, wherein the controller comprises electronic circuitry.

7. The system of claim 1, wherein the controller automatically reengage the differential lock when the detected temperature drops below a second chosen threshold that is less than the chosen threshold.

8. The system of claim 1, wherein the sensor comprises one of a thermocouple, a thermostat, a thermistor, or an RTD.

9. The system of claim 1, wherein the sensor is positioned near the differential lock without making contact with the differential lock.

10. The system of claim 1, wherein the sensor contacts the differential lock.

11. The system of claim 1, wherein the sensor is positioned within the differential lock.

12. The system of claim 2, wherein the controller provides the temperature information to a service technician.

13. A system for controlling a differential lock in a vehicle drive line, comprising:

a manual switch that is selectively operated by a vehicle operator to engage the differential lock;

a power source for energizing the differential lock responsive to operation of the manual switch; and a control element that automatically disconnects the differential lock from the power source whenever a temperature of the differential lock exceeds a chosen threshold.

14. The system of claim 13, wherein the control element includes a switch that is a normally closed thermostat that opens when the temperature exceeds the chosen threshold.

15. The system of claim 13, wherein the control element includes a controller, a temperature sensor and a switch and wherein the controller operates the switch responsive to a temperature indication from the temperature sensor.

16. A method of controlling a differential lock in a vehicle driveline, comprising the steps of:

(A) determining that a vehicle operator has manually engaged the differential lock;

(B) detecting a temperature of the differential lock;

(C) determining whether the detected temperature exceeds a chosen threshold; and (D) automatically disengaging the differential lock when the detected temperature exceeds the chosen threshold.

17. The method of claim 16, wherein step (B) includes using a temperature sensor that is positioned near the differential lock without contacting the differential lock.

18. The method of claim 16, including continuing to perform step (B) after performing step (D) and automatically reengaging the differential lock when the detected temperature drops below a second chosen threshold that is less than the chosen threshold.

19. The method of claim 16, including storing data representing changes in the detected temperature over time.

20. The method of claim 19, including providing the data representing changes in the detected temperature over time to a service technician.

* * * * *